United States Patent [19]
Vansaghi

[11] Patent Number: 4,834,525
[45] Date of Patent: May 30, 1989

[54] VISUAL AID DEVICE

[76] Inventor: Ronald A. Vansaghi, 1809 Bois D'Arc, Arlington, Tex. 76013

[21] Appl. No.: 109,818

[22] Filed: Oct. 16, 1987

[51] Int. Cl.⁴ .............................................. G02C 1/00
[52] U.S. Cl. ..................................... 351/158; 351/57
[58] Field of Search .......................... 351/158, 41, 57; 350/146

[56] References Cited

U.S. PATENT DOCUMENTS

| | | | |
|---|---|---|---|
| 2,024,322 | 12/1935 | Wittig | 88/41 |
| 3,064,528 | 11/1962 | Gelatt | 88/39 |
| 3,273,456 | 9/1966 | Feinbloom | 88/57 |
| 3,522,988 | 7/1968 | Daniels | 350/146 |
| 4,364,645 | 12/1982 | Feinbloom | 351/158 |
| 4,429,959 | 2/1984 | Walters | 351/158 |

OTHER PUBLICATIONS

Designs for Vison-Brochure.

Primary Examiner—Rodney B. Bovernick
Assistant Examiner—P. M. Dzierzynski
Attorney, Agent, or Firm—Charles D. Gunter, Jr.

[57] ABSTRACT

A visual aid device is shown for use by a wearer. The device includes a spectacle frame with a pair of carrier lenses mounted on the spectacle frame, each of the lenses having an aperture for receiving a bushing which protrudes through the lens. A bushing is fixedly mounted in each aperture at a predetermined inclination and declination. A quick release mount within each bushing allows the bushings to receive a variety of interchangeable optical devices.

10 Claims, 2 Drawing Sheets

VISUAL AID DEVICE

BACKGROUND OF THE INVENTION

1. Field of the Invention

The present invention relates generally to optical devices and specifically to eyeglass or spectacle mounted optical devices which serve as vision aides and enhancements.

2. Description of the Prior Art

Several types of visual aid devices are known which feature telescopes mounted to the eyeglass frame or to the spectacle lens. Such prior art devices have typically featured telescopes mounted by holding rings on the front of the spectacle lens and telescopes which are cemented through the spectacle lens. The existing devices are designed for a particular user with specific optical characteristics depending upon the physical anatomy of the user and the task at hand. Typical applications involve dental surgery, medical surgical specialties, impaired vision, industrial quality control and manufacture. Depending upon the intended application, the specific optical characteristics may vary. Thus, for example, a hand surgeon requires a different level of magnification than does a cardiovascular surgeon. A dentist requiring a 2X magnification for chairside work might require a higher level of magnification for laboratory bench work.

The existing devices require the user to purchase additional spectacles where the user requires additional levels of magnification and/or different optical systems, since the telescope tends to be permanently mounted to or within the spectacle lens. A different pair of spectacles is required each time the user changes the level of magnification or changes the working distance. In the case of the visually impaired, different spectacles are required for the work area and recreational pursuits.

U.S. Pat. No. 3,273,456, entitled "BIFOCAL LOUPES AND TELEMICROSCOPIC LENSES THEREFORE", issued Sept. 20, 1966 to William Feinbloom shows a device in which the telescope was inserted into and protruded through the spectacle carrier lens. This arrangement has the advantage of moving the telescopic eye piece closer to the eye of the wearer to provide improved visual characteristics. However, because each pair of spectacles had a permanently mounted telescope which was cemented into the lens opening, different spectacles were required to provide different levels of magnification and to accomodate different working distances.

A need exists for a vision aid spectacle having means for mounting a through-the-lens optical device, such as a telescope, which would allow the optical device to be quickly removed from the carrier lens of the spectacle to allow interchangeability of optical devices.

A need also exists for such a vision aid spectacle having a mounting means in the carrier lens of the spectacle which extends inwardly in the direction of the eye of the wearer to provide improved visual characteristics while allowing quick removal of an optical device installed therein.

Another need exists for a visual aid device having a mounting means which is fixed in the carrier lens of the spectacle frame at a given declination and inclination with respect to the normal line of sight of the wearer for properly aligning an optical device installed within the mounting means.

Additional objects, features, and advantages will be apparent in the written description which follows.

SUMMARY OF THE INVENTION

A visual aid device is shown for use by a wearer which includes a spectacle frame and a pair of carrier lenses mounted on the spectacle frame to encompass a horizontal line of sight of the wearer. Each of the carrier lenses has an aperture for receiving a bushing which protrudes through the lens. A bushing is fixedly mounted in each aperture at a predetermined inclination and declination with respect to the horizontal line, or usual line of sight of the wearer. Each bushing has a front portion which extends outwardly from the carrier lens and has a rear portion which extends inwardly from the carrier lens in the direction of the eye of the wearer of the device. A quick release mounting means provided within each bushing allows the interchange of a variety of optical devices, such as telescopes of varying magnification, without requiring the wearer to purchase an additional pair of spectacles.

Preferably, the quick release mounting is a bayonette-type mount provided within the front portion of each bushing for receiving a variety of interchangeable telescopes of varying magnification, whereby a single spectacle frame can be used to provide telescopic vision at various levels of magnification. Because the telescopic portion of the device can be removed prior to cleaning, the frame and carrier lens can be provided of heat and chemical resistant materials to allow easy cleaning and sterilization of the device. A corrective lens can also be installed within each bushing which is adapted to restore the vision of the eyeglass wearer to normal, whereby telescopic lenses of various standard magnification can be interchanged within a single pair of glasses to provide a range of available magnification to any given eyeglass wearer.

DESCRIPTION OF THE PREFERRED EMBODIMENT

Figure 1:
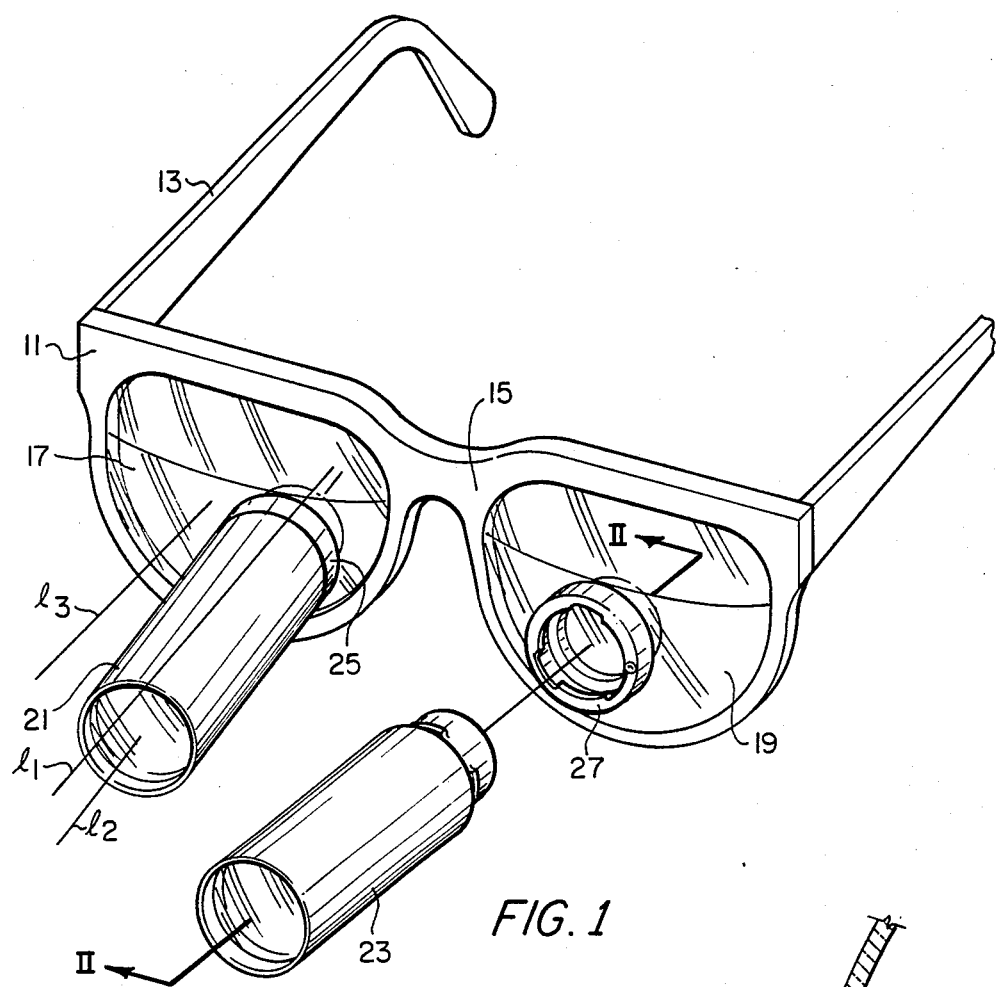
FIG. 1 is a perspective view of a visual aid device of the invention illustrating the installation of a telescope within the carrier lens bushing, the carrier lens being illustrated as bifocal.

FIG. 1 shows a visual aid device of the invention for use by an eyeglass wearer. The visual aid device includes a spectacle frame 11 having temple pieces 13, an intermediate nose bridge 15 and bifocal carrier lenses 17, 19. Each bifocal carrier lens 17, 19 has an optical device, such as telescopes 21, 23, mounted thereon by means of bushings 25, 27.

The carrier lenses 17, 19 can be made of clear transparent plastic or glass ground to a particular prescription for distant and near vision or may even be a plain lens without any visual corrective features. Preferably, the spectacle frame 11 and carrier lenses 17, 19 are made from heat and chemical resistant materials to allow sterilization of the frames and carrier lenses When the telescopes 21, 23 are removed from the bushings 25, 27. Most preferably, the spectacle frame 11 is of cast aluminum.

The carrier lenses 17, 19 are mounted on the spectacle frame 11 to encompass a normal or horizontal line of sight of the wearer, such as the distant viewing line $l_1$. Each carrier lens 17, 19 is provided with an aperture (29 in FIG. 2) for fixedly mounting a bushing 25, 27. Each bushing 25, 27 is mounted below the optical center line of its respective carrier lens and each bushing is set in its aperture at the proper "declination" and "inclination" required by the wearer for the task at hand. In the case of the bifocal corrected lens shown, the bushings are mounted below the bifocal segment line of the lens.

Determination of the proper angles of "declination" and "inclination" will be understood by those skilled in the art. These terms are explained for example, in U.S. Pat. No. 3,273,456, issued Sept. 20, 1966, to Feinbloom, the disclosure of which is incorporated herein by reference. It will be noted from FIG. 1 that the optical center line $l_2$ of the telescope 21 both declines downwardly from distant vision line $l_1$ and is inclined inwardly to converge with the optic center line of telescope 23 and near optical center of the spectacle 24. Generally speaking, the optical device or telescope 21, 23 will be "declinated" in its position in the carrier lens so that the posture of the wearer normally assumed while working at close distances is maintained while viewing through the telescope and through the near corrected portion of the lens.

The telescopes 21, 23 will be "inclinated" or converged in the carrier lenses so as to have binocular focus at the desired working distance. The convergence angle can be determined by the interpupillary distance, the working distance and interpupillary distance measured at the working distance, as will be familiar to those skilled in the art. This measurement can be mathematically determined based upon the known geometry of a right triangle. The infinity pupillary distance is the base of the triangle. The dimension from the base to the apex of the triangle is the working distance. With these two know values, the angle of convergence can be calculated. Additional calculation can be employed accounting for the distance in pupillary distance at working distance and at infinity.

In the devices of the present invention, for each angle of inclination, i.e. angle of line of sight to object, there will be provided a range of inclination angle bushings. Thus, for example, for each angle of declination between one and ten degrees (which will accomodate working distances of approximately 10″ to 24″), there will be a range of inclination angle bushings available for insertion in the carrier lens aperture, as determined by the triangle calculations. The completed spectacle with the bushing inserted can be tested by passing a laser light through the optical center of the bushing and converging on a target at the prescribed working distance. Minor adjustments to the placement of the bushing in the carrier lens can be performed at the time of installation.

The following example is intended to be illustrative of the invention:
declination—line of sight below horizontal.
inclination—convergence of line of sight.
PD.—pupillary distance measured from center of pupil right eye to center of pupil left eye.
infinity P.D.—measurement looking to infinity.
functional P.D.—measurement looking at object at working or reading distance.
bifocal—carrier lens divided into near and far correction.
working distance—distance from eye to near object.

EXAMPLE

Working distance 13 inches
Infinity P.D. 65 mm
Functional P.D. 59 mm

By using right triangle geometry, the angle of inclination (convergence) can be calculated to be 5 degrees. Thus, a "5 degree bushing" would be selected for installation into the spectacle carrier lens.

Figure 2:
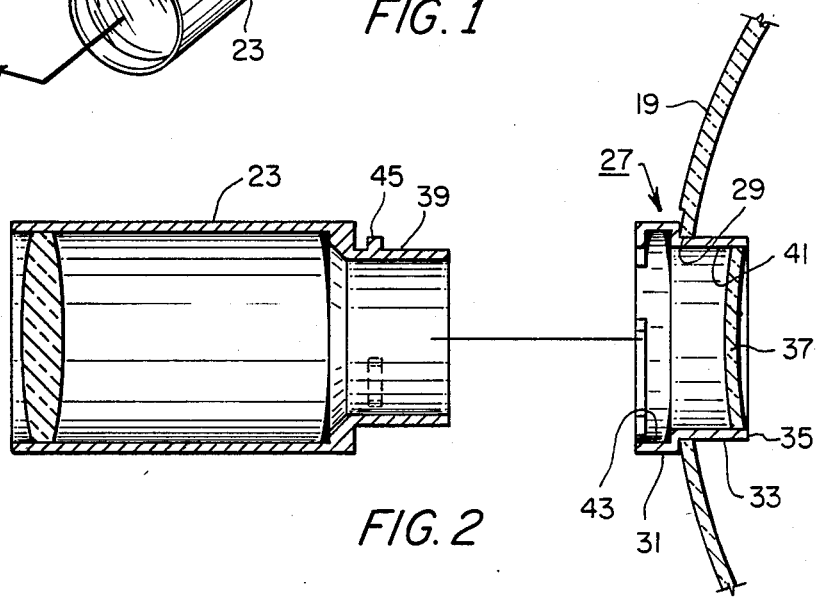
FIG. 2 is a side, cross-sectional view taken along lines II—II in FIG. 1 showing a telescope and bushing, the carrier lens being bifocal.
Figure 3:
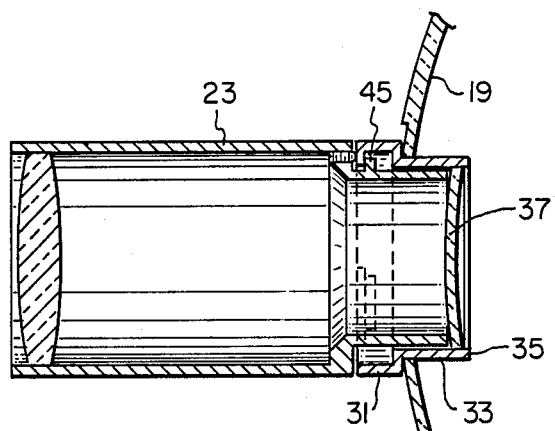
FIG. 3 is side, cross-sectional view similar to FIG. 2 showing the telescope installed within the bushing.

Referring to FIG. 2, it will be noted that each bushing 27 has a front portion 31 which extends outwardly from the carrier lens 19 and a rear portion 33 which extends inwardly from the carrier lens 19 in the direction of the eye of the wearer of the device. As a result, the innermost extent 35 of the bushing 27 is closer to the entrance pupil of the wearer's eye than the carrier lens 19. This distance can be kept as small as about 10 mm which is about the distance of the length of the eyelashes, thus achieving a wider field of vision while permitting more light to enter into the eye through the lens system.

A corrective, plano or other suitable lens 37 is contained within the fixed bushing 27 adjacent the innermost extent 35 and provides an individual prescription for the wearer, if required. The proximity of this corrective lens 37 to the wearer's eye reduces interference from side reflections and loss of contrast.

Figure 7:
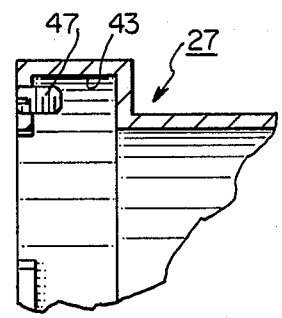
FIG. 7 is a partial, cross-sectional view taken along line 7—7 in FIG. 5.

A quick release mounting means is provided within the front portion 31 of the bushing 27 for receiving a variety of interchangeable telescopes/optical devices. This allows quick interchange of, for example, telescopes of varying magnification within a single pair of spectacles. Preferably, the quick release mounting means is a bayonette-type mount as shown in FIG. 2. A selected one of the bushing 27 and telescope 23 serves as a female member and the other of the bushing and telescope serves as a mating male member to allow the telescope to be removably engaged within the bushing. In the preferred example, the front portion of the bushing 31 is a female member while end 39 of the telescope 23 serves as a mating male member. The bushing interior bore 41 is provided with a circumferential groove 43 for receiving mating tab portions 45 of the telescope 23 in bayonette-fashion. As best seen in FIG. 7, the groove 43 is provided with a stop, such as screw 47, to limit the circumferential movement of the telescope tabs 45 within the circumferential groove 43.

Figure 4:
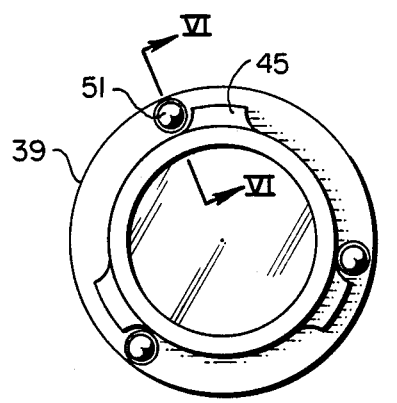
FIG. 4 is a perspective, end view of the telescope.
Figure 5:
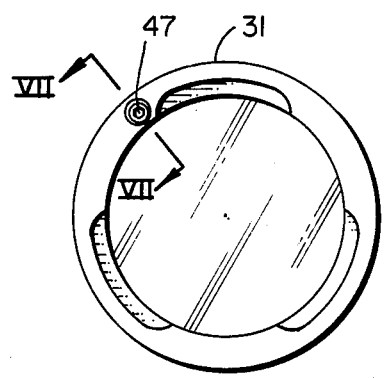
FIG. 5 is an end, perspective view of the bushing.
Figure 6:
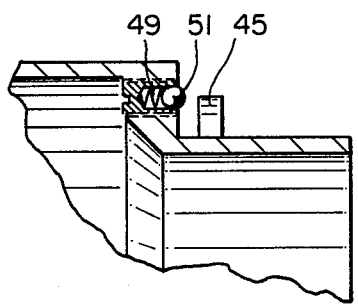
FIG. 6 is a partial, cross-sectional view taken along lines 6—6 in FIG. 4.

Biasing means, such as spring 49 and ball 51, are located on a selected one of the telescope 23 and bushing 27 for locking the telescope positively within the bushing after insertion. As seen in FIGS. 2 and 4, the spring-loaded ball 51 biases the telescope 23 outwardly with respect to bushing 27 to firmly engage the tab portions 45 within the groove 43. Although a spring-loaded ball type detent is shown, it will be understood that other biasing means can be employed, such as spring washers, Belleville type springs, and the like.

The operation of the device will now be described. As previously discussed, the bushings 25, 27 are first mounted in the aperture 29 provided in the carrier lenses 17, 19 at the proper angles of declination and inclination for the intended task and physical anatomy of the wearer. If the carrier lenses 17, 19 are prescription lenses, the lens 37 in the bushing 27 is also provided to correct the vision of the wearer while viewing through the bushing. The tailored spectacle frames, carrier lenses, and bushings will now allow a variety of interchangeable optical devices, such as telescopes 21, 23 or prisms (not shown) to be employed. The telescopes 21, 23 can be provided in standard ranges of magnification and can be quickly and easily interchanged by means of the bayonette-type mount provided in the bushings.

An invention has been provided with several advantages. The visual aid devices of the invention are custom designed for a particular user and particular task. A range of optical devices can be interchanged in the spectacles without the necessity of purchasing additional spectacles. Because the bushings are fixed within the apertures provided in the carrier lenses at the proper angles of declination and inclination and because of the positive lock mount, the optical device inserted will always be at the proper location and angle for the task for which it was designed. It will not be necessary to further adjust the location or angle as optical devices are interchanged. Because of the interchangeability of the optical devices, a single pair of spectacles can be used for various work tasks, recreational uses, and the like. Wearers can also share a common inventory of standard optical devices. It will be possible for a visually impaired person to remove one optical system and replace it easily with another system. This same procedure can be used by a surgeon whose requirements change during or between surgical procedures. Because the telescopes can be removed, the frames, carrier lenses and bushings can be made of materials suitable for sterilization by conventional steam, chemical or gas procedures. The spectacle frames can be provided with side shields, brow guards, extendible temples, and other safety features. The carrier lens portion of the spectacle can employ special scratch resistant coatings, color tinting and the like. The bushing will also accept a variety of optical systems, other than magnifying telescopes, such as camera lenses which would allow a user to record the image being viewed, magnifying/measuring systems and specialized color enhancement devices, or light transmission alterations.

While the invention has been described in only one of its forms, it should be apparent to those skilled in the art that it is not so limited, but is susceptible to various changes and modifications without departing from the spirit thereof.

I claim:
1. A visual said device for use by a wearer, comprising:
   a spectacle frame;
   a pair of carrier lenses mounted on the spectacle frame to encompass a normal viewing line of sight of the wearer, each of the carrier lenses having a degree of vision correction and having an aperture for receiving a bushing which protrudes through the lens;
   a bushing fixedly mounted in each aperture at a predetermined inclination and declination with respect to the normal viewing line of sight of the wearer, each bushing having a front portion which extends outwardly from the carrier lens and having a rear portion which extends inwardly from the carrier lens in the direction of the eye of the wearer of the device;
   a corrective lens contained within the fixed bushing, each corrective lens having a degree of vision correction, the degree of vision correction of the corrective lens being related to the degree of vision correction of the carrier lens; and
   quick release mounted means provided within each bushing for receiving a variety of interchangeable optical devices.

2. A visual aid device for use by a wearer, comprising:
   a spectacle frame;
   a pair of carrier lenses mounted on the spectacle frame to encompass a normal viewing line of sight of the wearer and having a degree of vision correction to correct the vision of the wearer to normal, each of the carrier lenses having an aperture for receiving a bushing which protrudes through the lens;
   a bushing fixedly mounted in each aperture at a predetermined inclination and declination with respect to the normal viewing line of sight of the wearer, each bushing having respect to the normal viewing line of sight of the wearer, each bushing having a front portion which extends outwardly from the carrier lens and having a rear portion which extends inwardly from the carrier lens in the direction of the eye of the wearer of the device;
   a vision correcting lens contained within the rear portion of the fixed bushing, the corrective lens having a degree of vision correction which is related to the degree of vision correction of the carrier lens to correct the vision of the wearer to normal; and
   quick release mounting means provided within the front portion of each busing for receiving a variety of interchangeable telescopes of varying magnification.

3. A telescopic visual aid device for use by a wearer, comprising:
   a spectacle frame;
   a pair of corrective carrier lenses mounted on the spectacle frame to encompass a normal viewing line of sight of the wearer and having a degree of vision correction to the vision of the wearer to normal, each of the carrier lenses having an aperture for receiving a bushing which protrudes through the lens;
   a bushing fixedly mounted in each aperture at a predetermined inclination and declination with respect to the normal viewing line of sight of the wearer, each bushing having a front portion which extends outwardly from the carrier lens and having a rear portion which extends inwardly from the carrier lens in the direction of the eye of the wearer of the device;
   a vision correcting lens contained within the rear portion of the fixed bushing, the corrective lens having a degree of vision correction which is related to the degree of vision correction of the carrier lens to correct the vision of the wearer to normal; and
   a quick release, bayonette-type mount provided within the front portion of each bushing for receiving a variety of interchangeable telescopes of varying magnification whereby a single spectacle frame can be used to provide telescopic vision at various levels of magnification.

4. The visual aid device of claim 3, wherein the bushing is a tubular member having an interior bore which provides a field of view for the wearer, the interchangeable telescope also comprising a tubular member having an internal bore which is alignable with the interior bore of the bushing to provide a magnified field of view when the telescope is in place in the bayonette mount.

5. The visual aid device of claim 4, wherein a selected one of the bushing and the telescope serves as a female member and the other of the bushing and telescope serves as a mating male member to thereby allow the telescope to be removably engaged with the bushing.

6. The visual aid device of claim 5, wherein the front portion of the bushing is a female member and one end of the telescope serves as a mating male member, the bushing interior bore being provided with a circumferential groove for receiving mating tab portions of the telescope to removably engage the telescope with the bushing in bayonette fashion.

7. The visual aid device of claim 6, wherein the circumferential groove is provided with a stop to limit the circumferential movement of the telescope tabs within the circumferential groove.

8. The visual aid device of claim 7, further comprising:
biasing means located on a selected one of the telescope male portion and the female bushing for locking the telescope positively within the bushing.

9. The visual aid device of claim 3, wherein the spectacle frame and carrier lenses are made from heat and chemical resistant materials to allow sterilization of the frames and carrier lenses when the telescopes are removed from the bushings.

10. A method of changing the available magnification provided by a pair of telescopic eyeglasses of the type having a spectacle frame and a pair of carrier lenses mounted on the frame to encompass a normal viewing line of sight of the wearer, each of the carrier lenses having a degree of vision correction, the method comprising the steps of:
providing an aperture in each of the carrier lenses for receiving a bushing which protrudes through the lens;
fixedly mounting a bushing in each aperture at a predetermined inclination and declination with respect to the normal viewing line of sight of the wearer, each bushing having a front portion which extends outwardly from the carrier lens and having a rear portion which extends inwardly from the carrier lens in the direction of the eye of the wearer of the device;
providing a quick release mount within each bushing of the type adapted to receive a variety of interchangeable telescopes of varying magnification;
installing a corrective lens within each bushing, the corrective lens having a degree of vision correction which is related to the degree of vision correction of the carrier lenses to restore the vision of the wearer to normal, whereby telescopic lenses of various standard magnification can be interchanged within a single pair of glasses to provide a range of available magnification to an eyeglass wearer; and
changing the available magnification of the eyeglasses by interchanging telescopes of various magnification within the bushings, the bushings remaining fixed within the carrier lenses at all times.

* * * * *

UNITED STATES PATENT AND TRADEMARK OFFICE
CERTIFICATE OF CORRECTION

PATENT NO. : 4,834,525

DATED : May 30, 1989

INVENTOR(S) : Ronald E. Vansaghi

It is certified that error appears in the above-identified patent and that said Letters Patent is hereby corrected as shown below:

Change the inventor's name on page 1 from "Ronald A. Vansaghi" to --Ronald E. Vansaghi--.

Signed and Sealed this

Twenty-first Day of May, 1991

Attest:

HARRY F. MANBECK, JR.

Attesting Officer

Commissioner of Patents and Trademarks